United States Patent
Tariq

(10) Patent No.: US 10,922,574 B1
(45) Date of Patent: Feb. 16, 2021

(54) BOUNDING BOX EMBEDDING FOR OBJECT IDENTIFYING

(71) Applicant: Zoox, Inc., Foster City, CA (US)

(72) Inventor: Sarah Tariq, Palo Alto, CA (US)

(73) Assignee: Zoox, Inc., Foster City, CA (US)

( * ) Notice: Subject to any disclaimer, the term of this patent is extended or adjusted under 35 U.S.C. 154(b) by 136 days.

(21) Appl. No.: 16/215,554

(22) Filed: Dec. 10, 2018

(51) Int. Cl.
*G06K 9/00* (2006.01)
*G06K 9/32* (2006.01)
*G06T 7/10* (2017.01)
*G06N 3/08* (2006.01)

(52) U.S. Cl.
CPC ....... *G06K 9/3233* (2013.01); *G06K 9/00791* (2013.01); *G06N 3/08* (2013.01); *G06T 7/10* (2017.01)

(58) Field of Classification Search
CPC .... G06K 9/00791; G06K 9/3233; G06T 7/10; G06N 3/08
See application file for complete search history.

(56) References Cited

U.S. PATENT DOCUMENTS

| | | | |
|---|---|---|---|
| 2014/0376819 A1* | 12/2014 | Liu | G06K 9/3233 382/205 |
| 2018/0089505 A1* | 3/2018 | El-Khamy | G06K 9/6256 |
| 2019/0272645 A1* | 9/2019 | Huang | G06N 3/08 |
| 2020/0118423 A1* | 4/2020 | Moura | G06N 3/08 |

\* cited by examiner

*Primary Examiner* — Ping Y Hsieh
(74) *Attorney, Agent, or Firm* — Lee & Hayes, P.C.

(57) ABSTRACT

Techniques are disclosed for implementing a neural network that outputs embeddings. Furthermore, techniques are disclosed for using sensor data to train a neural network to learn such embeddings. In some examples, the neural network may be trained to learn embeddings for instance segmentation of an object based on an embedding for a bounding box associated with the object being trained to match pixel embeddings for pixels associated with the object. The embeddings may be used for object identification, object matching, object classification, and/or object tracking in various examples.

20 Claims, 6 Drawing Sheets

US 10,922,574 B1

BOUNDING BOX EMBEDDING FOR OBJECT IDENTIFYING

BACKGROUND

Methods, apparatuses, and systems utilize various types of data, such as image data or lidar data, just to name a few examples, to perform functions that allow robotic platforms to navigate through environments. For example, an autonomous vehicle may use image data and/or other sensor data for navigation to track objects and obstacles, such as other vehicles, buildings, pedestrians, etc. Equipping a computer with such functionality may include building software components that take an image, identify salient portions of the image, and represent the salient portions to the computer in a form that the computer can use to conduct further operations. One form of software that can be built to equip a computer with such functionality are machine-learned (ML) models.

Previous attempts to train ML models to identify salient portions of an image have resulted in flawed or inaccurate ML models. For example, some forms of ML model training result in a ML model that cannot properly distinguish between objects that are proximate to each other (e.g., a pedestrian that passes in front of another pedestrian in the camera's view), resulting in extraneous and/or inaccurate identifications of one or both objects.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

Figure 1:
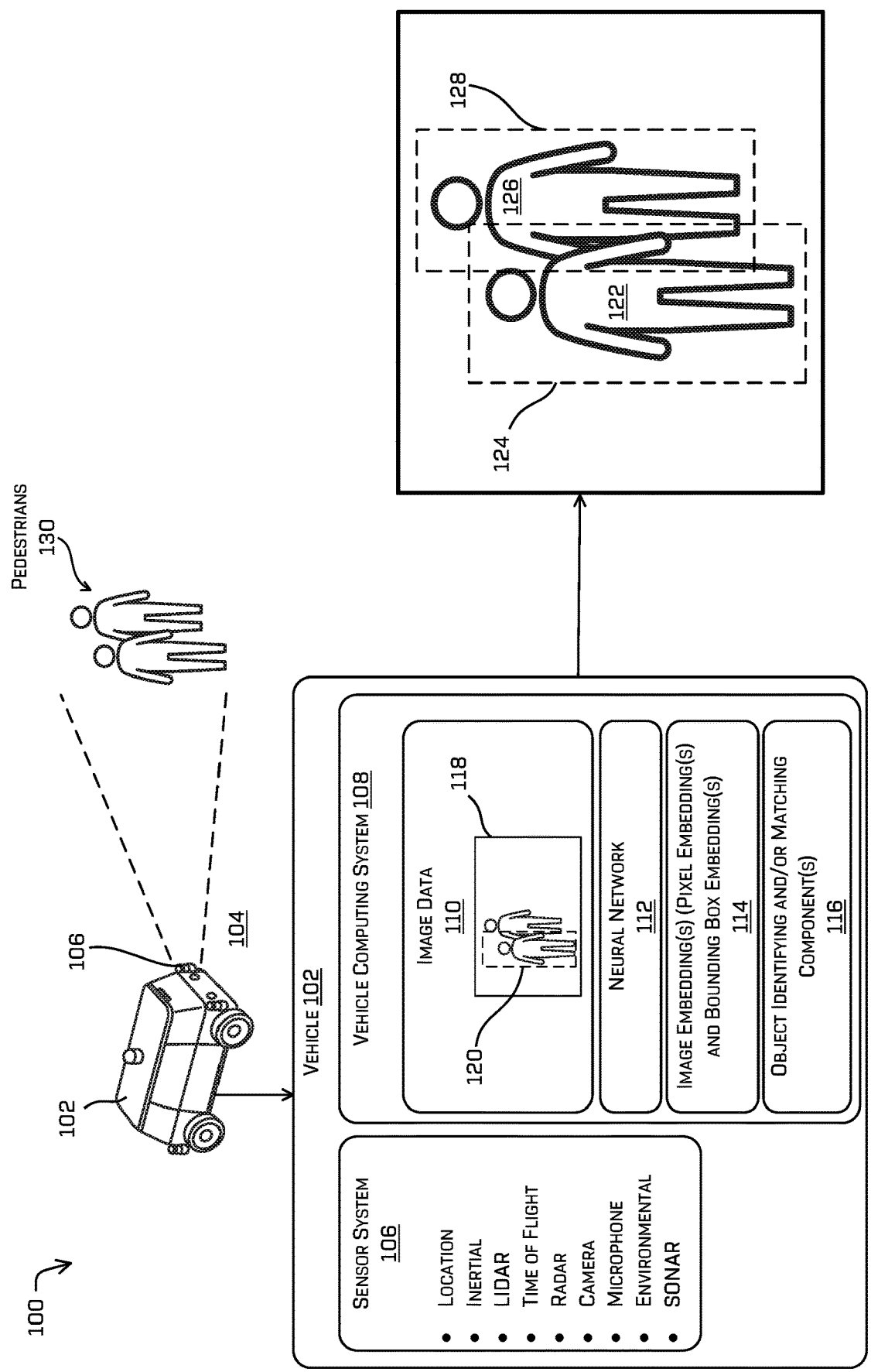
FIG. 1 illustrates an example environment that includes a vehicle having a neural network that outputs image embeddings and bounding box embeddings that may be used to identify and/or match objects, as described herein.

This disclosure is directed to techniques for implementing a neural network that outputs embeddings (e.g., image embeddings). Among other possible types of sensor data, this disclosure illustrates techniques for using images, or portions thereof, to train a neural network to learn image embeddings. Image embeddings may be used for object identification, matching, and/or tracking.

As used herein, an embedding is a parameter associated with an entity such as an image, an object, a pixel, a bounding box, and so on. The parameter may comprise a set of values to at least partially describe the associated entity. For example, the parameter may be in the form of a vector (having 256 elements in some particular implementations) or tensor and may be determined (e.g., via training) by a system or network.

As described below, a system may determine an embedding for a bounding box that surrounds an object (e.g., in an image). The system may also determine an embedding for a pixel (e.g., in the image). Accordingly, techniques described herein may provide an ability to determine which pixel belongs with which bounding box. Such an ability may allow for an improvement for performing instance segmentation, which is a pixel-level partitioning (e.g., segmentation) of an entity (e.g., an object). For example, techniques described herein may be useful for distinguishing one object from another object in an image, even in relatively difficult scenarios in which the objects are overlapping or touching one another.

The techniques discussed herein may include providing an image to a machine learning (ML) model and receiving, from the ML model, classifications and/or identifications for one or more objects in an image. An identification for an object, for example, may include a bounding box that surrounds the object and thus indicates pixels identified as being associated with the object. Such a bounding box may comprise coordinates of a rectangular border that fully encloses the object in the image. In another example, an identification for an object may include a mask that includes pixels that correspond to the object.

Techniques discussed herein improve computer vision by increasing the accuracy of object detection and decreasing compute time for obtaining object identifications so that objects may be detected in real time for use in applications such as autonomous vehicle control, for example. The techniques discussed herein may also be considered for any of a number of other applications such as, for example, video games, augmented reality, general machine vision, etc.

In various embodiments, one or more sensors (e.g., one or more image sensors, one or more lidar sensors, one or more radar sensors, and/or one or more time-of-flight sensors, etc.) of a vehicle (e.g., an autonomous vehicle) may capture images or data of objects. A computing system of the vehicle may receive image data (or other type(s) of data) and input at least a portion of the image data (e.g., image patches) into a neural network trained to learn image embeddings. Such image embeddings may comprise pixel embeddings, which are embeddings for individual pixels or for groups of pixels. Additionally, the image embeddings may comprise bounding box embeddings associated with the pixel embeddings.

According to some examples, the computing system of the vehicle may determine, based at least in part on image embeddings output from the neural network, an identity of one or more objects (e.g., a unique identifier for a particular object). Additionally, or alternatively, the computing system may determine, based at least in part on the image embeddings output from the neural network, whether an object matches another object. For example, the computing system may determine that a distance between embeddings associated with an image may satisfy a threshold distance (e.g., a distance that is close to, or equal to, zero). Furthermore, the computing system may determine, based at least in part on the distances satisfying the threshold distance, that object detections associated with the images is associated with a same object (e.g., a same bicycle), a same class of object, or a different class of object.

The techniques discussed herein can improve a functioning of a computing device in a number of ways. For example, the techniques discussed herein may include training a neural network to learn image embeddings, which may allow a computing device to track objects temporally and/or spatially more accurately. As such, the computing system of a vehicle, for example, may be able to improve its tracking of objects (e.g., obstacles) and its trajectory and/or route planning, e.g., to control movement of the vehicle to avoid colliding with obstacles. For example, determining whether an object corresponds to another object (e.g., the two objects are the same object) or whether the object corresponds to a bounding box of the object may affect how the vehicle is controlled. These and other improvements to the functioning of the computing system are discussed herein.

The techniques described herein can be implemented in a number of ways. Example implementations are provided below with reference to the following figures. Although discussed in the context of an autonomous vehicle, the methods, apparatuses, and systems described herein can be applied to a variety of systems (e.g., a robotic platform, manually driven vehicles, etc.), and is not limited to autonomous vehicles. In another example, the techniques can be utilized in an aviation or nautical context, or in any system using machine vision. Additionally, the techniques described herein can be used with real data (e.g., captured using sensor(s)), simulated data (e.g., generated by a simulator), or any combination of the two. Furthermore, the techniques described herein may utilize various other sensor data (e.g., lidar data, radar data, time-of-flight data, and/or depth image data, etc.)

FIG. 1 illustrates an example environment 100 that includes a vehicle 102 having a neural network that outputs image embeddings that may be used to identify and/or match objects, according to some embodiments. Though depicted as a separate network for illustrative purposes in FIG. 1, it is understood that such a network may form a subnetwork of a larger network trained to output an object identification, classification, and the like. In some examples, the environment 100 may include one or multiple features, components, and/or functionality of embodiments described herein with reference to FIGS. 2-7.

In some examples, vehicle 102 may be configured to travel across a surface 104 (e.g., a road surface), for example, to transport people and/or cargo from a first location to a second location. For the purpose of illustration, vehicle 102 may be an autonomous vehicle configured to operate according to a Level 5 classification issued in 2013 by the U.S. National Highway Traffic Safety Administration, which describes a vehicle capable of performing all safety-critical functions for the entire trip, with the driver (or occupant) not being expected to control the vehicle at any time. In that case, since the vehicle may be configured to control all functions from start to stop, including all parking functions, it may be unoccupied. This is merely an example, and the systems and methods described herein may be incorporated into any vehicle and/or robot, including those ranging from vehicles that need to be manually controlled by a driver at all times, to those that are partially autonomously controlled, such that they can be autonomously controlled without driver attention or assistance during certain driving conditions, such as, for example, while operating on limited-access highways, but such that they require driver attention and/or assistance during other driving conditions, such as, for example, while operating on city streets in urban areas, or during at least some parking functions.

In some examples, vehicle 102 may be an automobile having four wheels and respective tires for each of the wheels. Other types and configurations of vehicles are contemplated, such as, for example, vans, sport utility vehicles, cross-over vehicles, trucks, buses, agricultural vehicles, and construction vehicles. Vehicle 102 may be powered by one or more internal combustion engines, one or more electric motors, hydrogen power, or any combination thereof. In addition, although the example vehicle 102 may have four wheels, the systems and methods described herein may be incorporated into vehicles having fewer or a greater number of wheels, tires, and/or tracks. Vehicle 102 may have four-wheel steering and may operate generally with equal performance characteristics in all directions, for example, such that a first end of vehicle 102 may be in the front end of vehicle 102 when traveling in a first direction, and such that the first end may become the rear end of vehicle 102 when traveling in an opposite, second direction. Similarly, a second end of vehicle 102 may be the front end of vehicle 102 when traveling in the second direction, and the second end may become the rear end of vehicle 102 when traveling in the opposite, first direction. These example characteristics may facilitate greater maneuverability, for example, in small spaces or crowded environments, such as parking lots and urban areas.

According to various embodiments, the vehicle 102 may include a sensor system 106. Furthermore, in various examples, vehicle 102 may include a vehicle computing system 108. The vehicle computing system 108 may include one or more components that cause the vehicle computing system 108 and/or the vehicle 102 to perform various operations. In various embodiments, the vehicle computing system 108 may receive image data 110 (e.g., real-time data and/or data stored in a memory device of the system) and comprise a neural network 112 configured to output one or more image embeddings 114 and/or object identifying (and/or matching) component(s) 116. Image data 110 may include one or more images 118 and/or one or more image patches 120, which are portions of an image. In some examples, vehicle computing system 108 may detect an object 122 in an image and generate as output a bounding box 124 around the object in the image.

In some implementations, the bounding box and an instance segmentation of the object are associated with a feature map, which may be based on image data 110. If a second object is in the image, vehicle computing system 108 may detect the second object 126 and generate an associated bounding box 128 around the object in the image. Vehicle computing system 108 may leverage bounding boxes 128 to perform an instance segmentation as part of a determination of whether a group of pixels belongs to the first object and another group of pixels belong to the second object. In some implementations, vehicle computing system 108 may crop the image (e.g., substantially along a bounding box, based on a pixelwise instance) to produce an image patch, such as 120, which represents the detected object.

In some examples, sensor system 106 (e.g., via an image sensor or camera) of vehicle 102 may capture one or more images of a scene. In a non-limiting example, sensor system 106 may capture images of a scene that includes pedestrians 130. As depicted in FIG. 1, pedestrians 130 includes object 122 (e.g., a first person) and object 126 (e.g., a second person). In some implementations, vehicle computing system 108 may attempt to track pedestrians 130 based at least in part on the images captured by sensor system 106. As indicated in FIG. 1, sensor system 106 may capture image 118 that includes pedestrians 130, wherein one pedestrian occludes the other (e.g., object 122 occludes object 126, or stated differently, the first person is standing partially in front of the second person, with respect to the position of sensor system 106). Such a situation, among others, presents a relatively difficult task of identifying one pedestrian from the other, as described below.

In some examples, image data 110 may include an image 118 and one or more bounding boxes associated with each of pedestrians 130 from the perspective of a camera of sensor system 106 of vehicle 102, as indicated in FIG. 1. As discussed in further detail below, image data 110, neural network 112, image embedding(s) 114, and/or the object identifying (and/or matching) component(s) 116 may be used to determine that a group of pixels belongs to the first person (object 122) and another group of pixels belong to the second person (object 126), despite the close and overlapping juxtaposition of the two pedestrians from the perspective of vehicle 102.

According to some embodiments, image data 110 may be used as inputs to neural network 112, which may be trained to learn image embeddings (e.g. an N-dimensional vector). Accordingly, neural network 112 may output image embedding(s) 114. According to some implementations, pixel-wise segmentation of an object (e.g., 122 or 126) and bounding box (e.g., 124 or 128) may be determined from output from neural network 112, which may receive image embedding 114 that includes pixel embeddings and bounding box embeddings. Such embeddings may be in the form of a vector that may be represented by a point/location in the spatial representation associated with the embedding.

According to some embodiments, object identifying and/or matching component(s) 116 may determine, based at least in part on image embeddings 114 output from neural network 112, an identity of one or more objects (e.g., a unique identifier for a particular object). Additionally, or alternatively, object identifying and/or matching component(s) 116 may determine, based at least in part on image embeddings 114 output from neural network 112, whether an object matches another object (e.g., from another image frame, as captured by another sensor, etc.). More particularly, object identifying and/or matching component(s) 116 may identify and/or match components based at least in part on a mapping between pixel embeddings of pixels (e.g., pixel-based embeddings) of an object and a bounding box embedding of the bounding box of the object. The pixel embeddings and the bounding box embedding are output from neural network 112. The mapping between or among the pixel-based embeddings and the bounding box embedding may lead to instance segmentation for identifying each of objects 122 and 126 (e.g., differentiating the first person from the second person).

For example, object identifying and/or matching component(s) 116 may determine that distances, in a spatial representation of embedding space, between points associated with pixels of an object and a bounding box of the object may satisfy a threshold distance (e.g., a distance that is close to, or equal to, zero). Accordingly, object identifying and/or matching component(s) 116 may determine, based at least in part on the distances satisfying a threshold distance, that an object detection associated with the pixel embeddings of the object and an object detection associated with the bounding box embedding are associated with a same object. Such associated pixels may, in turn, be used to identify an instance segmentation of an object. For example, object identifying and/or matching component(s) 116 may determine that an object detection associated with the pixel embeddings of object 122 and an object detection associated with an embedding for bounding box 124 are associated with a same object (e.g., object 122). This is in contrast to, for example, erroneously determining that object 126 is associated with bounding box 124 or that object 122 is associated with bounding box 128.

In some embodiments, sensor system 106 may include light detection and ranging (lidar) sensors, radio detection and ranging (radar) sensors, ultrasonic transducers, sound navigation and ranging (sonar) sensors, location sensors (e.g., global positioning system (GPS), compass, etc.), inertial sensors (e.g., inertial measurement units, accelerometers, magnetometers, gyroscopes, etc.), cameras (e.g., RGB, IR, intensity, depth, time of flight, etc.), wheel encoders, microphones, environment sensors (e.g., temperature sensors, humidity sensors, light sensors, pressure sensors, etc.), etc. Sensor system 106 can generate sensor data, which can be utilized by vehicle computing system 108 associated with vehicle 102.

Figure 2:
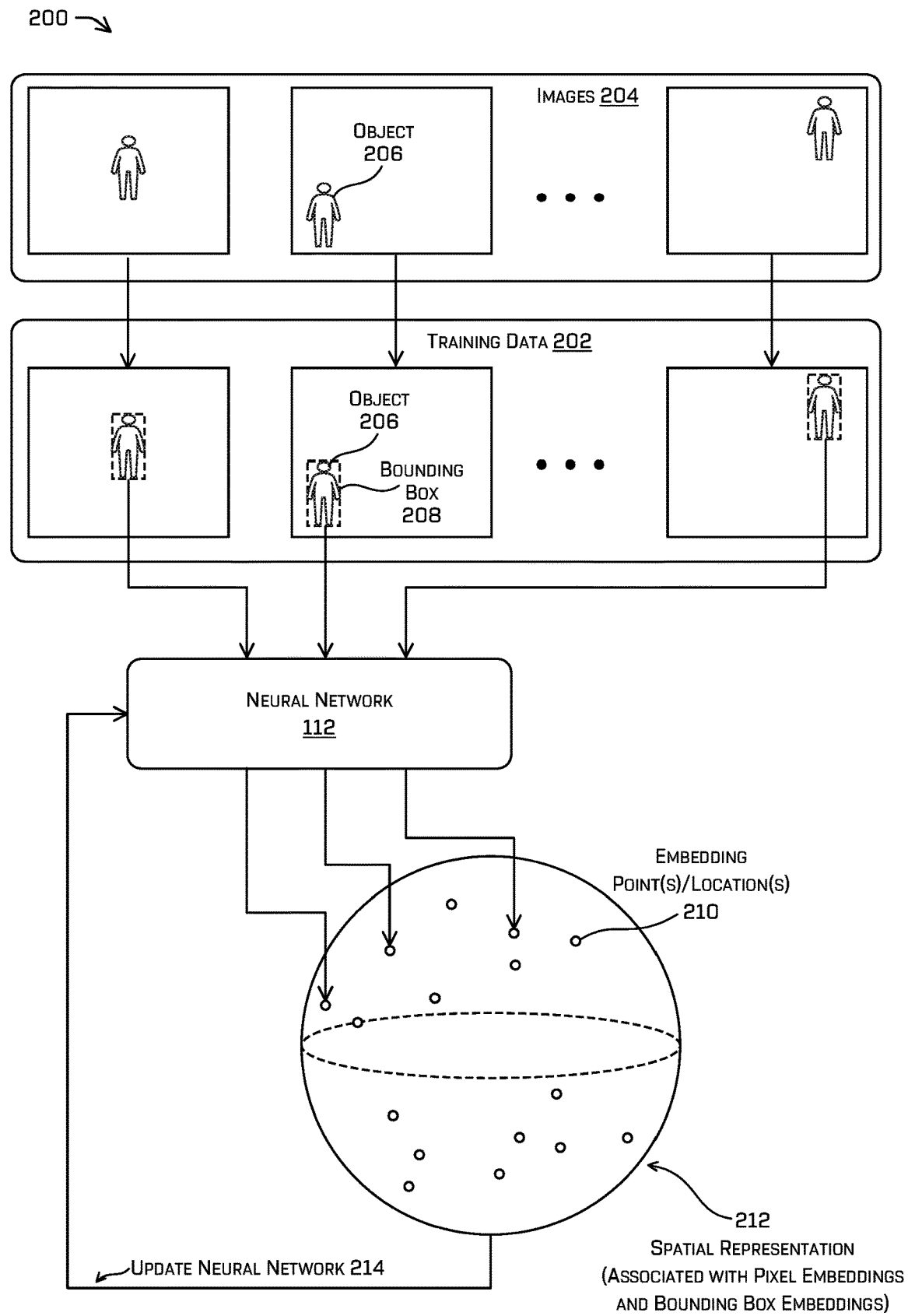
FIG. 2 is a schematic diagram illustrating an example of training a neural network to learn image embeddings and bounding box embeddings, as described herein.

FIG. 2 is a schematic diagram illustrating an example 200 of training a neural network to learn image embeddings, according to some embodiments. Additionally, such a network may be trained to output an embedding of a bounding box associated with the object in the image. Example 200 may involve training data 202 to be used as inputs into neural network 112. In some implementations, training data 202 may be derived from images 204 (and/or image patches) that are produced based at least in part on images captured by a vehicle (e.g., vehicle 102), as described above. For example, vehicle computing system 108 may detect an object 206 in an image and subsequently generate a bounding box 208 associated with the object. In some examples, training data 202 may include images or image patches.

In some embodiments, neural network 112 may be trained to learn image embeddings (e.g., image embedding(s) 114) that may be associated with multiple classes of objects. As a non-limiting example, the classes of objects may include vehicles, bicycles, pedestrians, and/or drivable surfaces, etc.

In various embodiments, neural network 112 may be trained to output, based at least in part on training data 202, embeddings of an instance of an object in an image and an embedding of a bounding box of the object. A loss associated with such a training may enforce embeddings associated with pixels of a ground truth instance segmentation and their corresponding bounding box to be substantially similar. Embeddings may be represented by embedding point(s)/location(s) 210 in a spatial representation 212. In some examples, the image embeddings output from neural network 112 may be normalized. When normalized, such embeddings can be visualized as laying on the surface of a N-dimensional unit sphere. For illustrative purposes, such a depiction is shown as spatial representation 212 (though only illustrating three-dimensions), while embeddings can have 128, 256, 1024, or any number of dimensions.

As indicated in FIG. 2, example 200 may include updating 214 the neural network. For example, neural network 112 may be updated based on an evaluation of the image embeddings. In some examples, the neural network may be updated to minimize one or more loss functions (e.g., a hinge loss) associated with the image embeddings. In some implementations, a loss may be calculated based at least in part on the difference, or a square of the difference, between embeddings.

Figure 3:
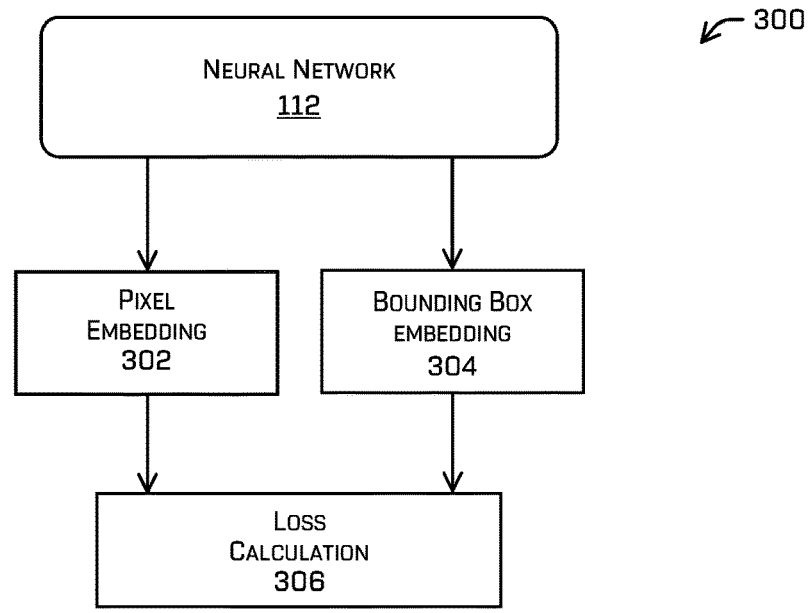
FIG. 3 is a schematic diagram illustrating an example of implementing a neural network that outputs image embeddings and bounding box embeddings and determines an associated loss, as described herein.

FIG. 3 is a schematic diagram illustrating an example 300 of implementing a neural network that outputs image embeddings and bounding box embeddings and determines an associated loss. In some examples, example 300 may include one or multiple features, components, and/or functionality of embodiments described herein with reference to FIGS. 1 and 2.

In various embodiments, example 300 may involve images that include one or more objects and bounding boxes respectively associated with the objects. A bounding box for an object may be determined subsequent to detection of the corresponding object in an image. Data associated with an image, which comprises pixels, may be provided to neural network 112, which may output per-pixel embeddings 302 of individual pixels and a bounding box embedding 304 of the bounding box. An individual embedding of per-pixel embeddings 302 may comprise, for example, a vector having elements that are associated with the pixel. Bounding boxes output by such a network may comprise, for example, anchor points (e.g., four coordinates) and elements that describe various qualities of the bounding box (e.g., uncertainties with respect to classifications, coordinates, extents, and the like). Such a bounding box output may also comprise a bounding box embedding 304. The bounding box embedding 304 (or parameters) may comprise, for example, a vector having elements that are associated with the bounding box. In some implementations, the anchor points and the elements that describe various qualities of the bounding box are grouped in a vector. The bounding box embedding 304 (which may be represented as a vector) includes parameters that are similar to or the same as parameters of the vector for per-pixel embeddings 302. Both per-pixel embeddings 302 and bounding box embedding 304 are used for a loss calculation 306 that may use a loss function, such as an L2 loss function. For example, the loss function may be a sum of the squared differences between the embeddings for the pixels (e.g., an average of per-pixel embeddings 302) and the bounding box embedding 304. During training, only those pixel embeddings 302 associates with an instance segmentation may be averaged and compared to the bounding box embedding 304. By minimizing (e.g., or otherwise reducing to a local minimum) the loss, neural network 112 may be trained to output similar embeddings for pixels of an instance, as well as a corresponding bounding box. The loss function (e.g., loss calculation 306) may be performed as an auxiliary loss (e.g., in addition to losses for training portions of the neural network 112 to output instance segmentations and bounding boxes separately) and/or may be a sole loss for the network, in which case the loss contemplates additional components for enforcing the network to output correct bounding boxes, instance segmentation pixels, as well as similar embeddings between elements of the two. Though depicted in FIG. 3 for illustrative purposes as a single network, the neural network 112 may comprise multiple networks having varying complexity, one head of which configured to output the pixel embeddings 302 (pixel parameters) and another head of which may be configured to output the bounding box embeddings 304 (box parameters).

Figure 4:
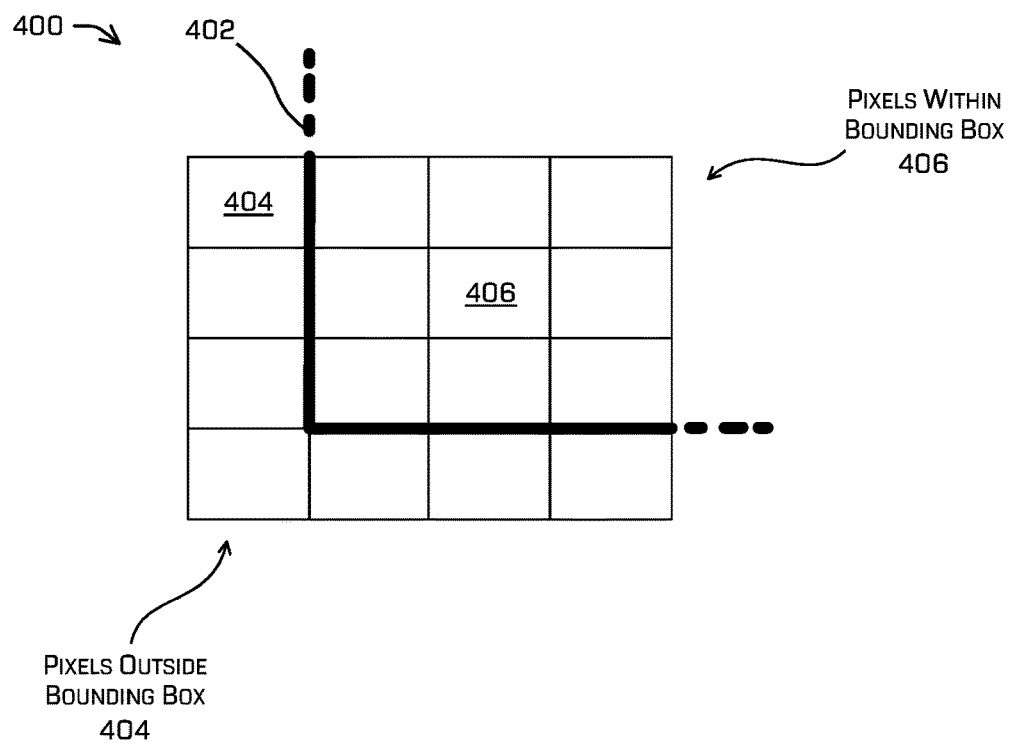
FIG. 4 is a schematic diagram illustrating pixels and a portion of a bounding box, according to some embodiments.

FIG. 4 is a schematic diagram 400 that illustrates pixels and a portion of a bounding box 402. The pixels are categorized as pixels 404 outside bounding box 402 and pixels 406 within the perimeter of bounding box 402. The illustrated pixels and the portion of bounding box 402 may be a portion of an image, such as image 118. Bounding box 402 may the same as or similar to bounding box 124, for example.

Referring to FIG. 3, a system, such as neural network 112 for example, may determine a bounding box embedding 304 and pixel (e.g., per-pixel) embeddings 302 for individual ones of pixels 406 within bounding box 402. In some implementations, individual embeddings for pixels 406 may be averaged together (or may be combined using another type of function) and compared with bounding box embedding 304. In some examples, only those pixels belonging to a ground truth instance segmentation associated with the box are averaged. As discussed above, the pixel embeddings (e.g., the average) and the bounding box embedding may be used for loss calculation 306. By minimizing the loss, neural network 112 may be trained to output embeddings that are similar for pixels of an instance, such as pixels 406 within bounding box 402 (and which may correspond to an associated instance segment), and the bounding box.

Once a network is trained, it is then possible to discern between two objects, even where one object occludes another. As a non-limiting example, where an image may include more than one object (and thus more than one bounding box), the system may perform this technique of comparing pixel embeddings output from the network with bounding box embeddings output from the network to determine which pixels belongs with which bounding box. Doing such may provide both instance segmentations (e.g., by grouping pixels having similar embeddings), as well as providing an association between output bounding boxes with the instance. This may allow for an improvement for performing instance segmentation, for example, to distinguish one object from another object in an image, even in relatively difficult scenarios in which the objects are overlapping or touching one another.

Figure 5:
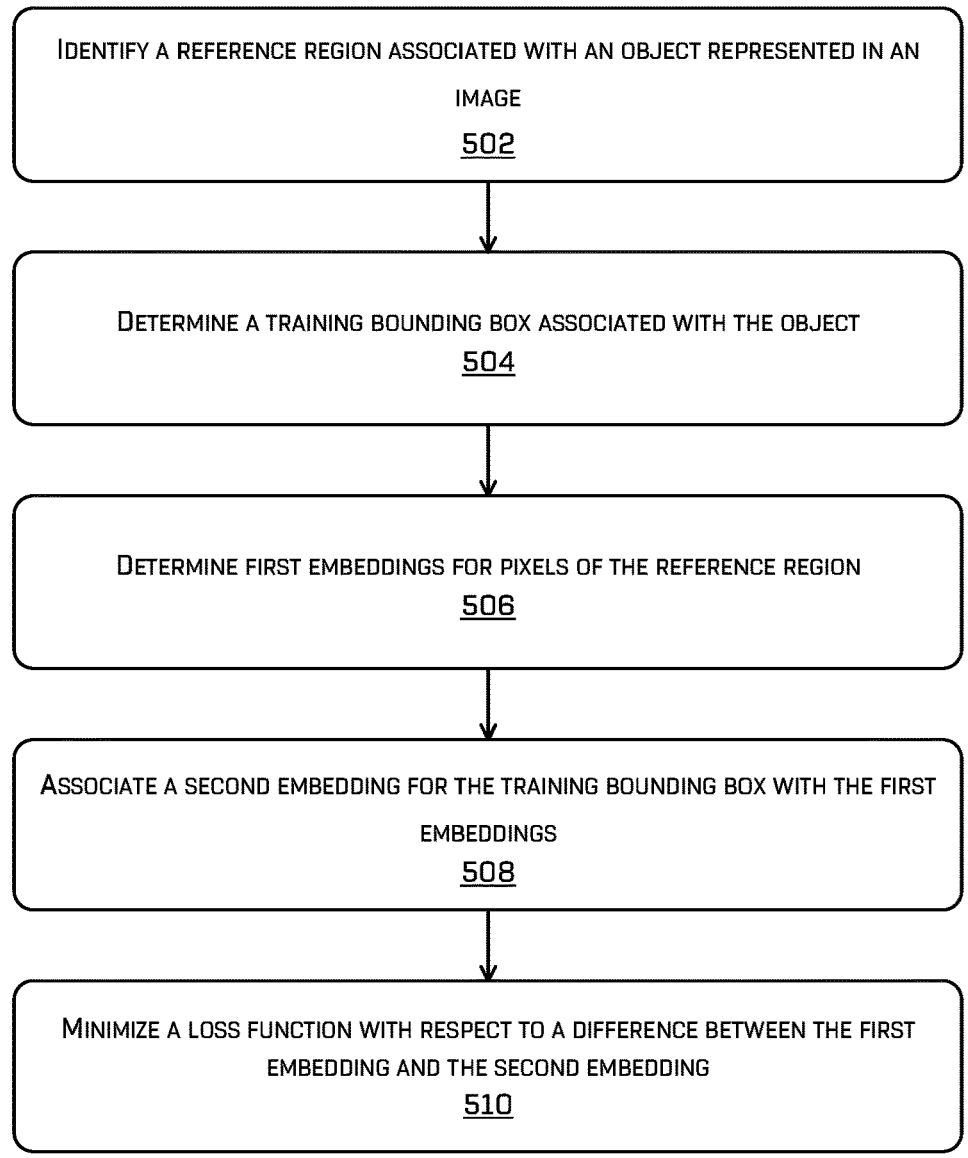
FIG. 5 is a flow chart illustrating an example process for training a neural network to learn image embeddings and bounding box embeddings associated with multiple classes of objects, as described herein.

FIG. 5 is a flow chart illustrating an example process 500 for training a neural network to learn pixel embeddings and bounding box embeddings, as described herein. In some implementations, a machine learning model may be trained to substantially simultaneously output multiple output regions of interest corresponding to classifications (e.g., or a bounding box) based, at least in part, on an image. Such classifications may comprise one or more of a vehicle, a pedestrian, or a bicyclist. In some examples, process 500 may include one or multiple features, components, and/or functionality of embodiments described herein with reference to FIGS. 1-4. For instance, process 500 may be performed by vehicle computing system 108.

At 502, vehicle computing system 108 may identify a reference region associated with an object represented in an image. For example, such a reference region may be identified for the object (e.g., 206) in a portion of an image (e.g., 204) and may encompass all or a portion of the object. At 504, vehicle computing system 108 may determine a training bounding box, such as bounding box 208, associated with the object. At 506, vehicle computing system 108 may determine first embeddings for pixels of the reference region. At 508, vehicle computing system 108 may associate a second embedding for the training bounding box with the first embeddings. At 510, vehicle computing system 108 may minimize a loss function (e.g., such as an L2 loss function, though other types of loss functions may be used as well) with respect to a difference be between the first embeddings and the second embedding.

Figure 6:
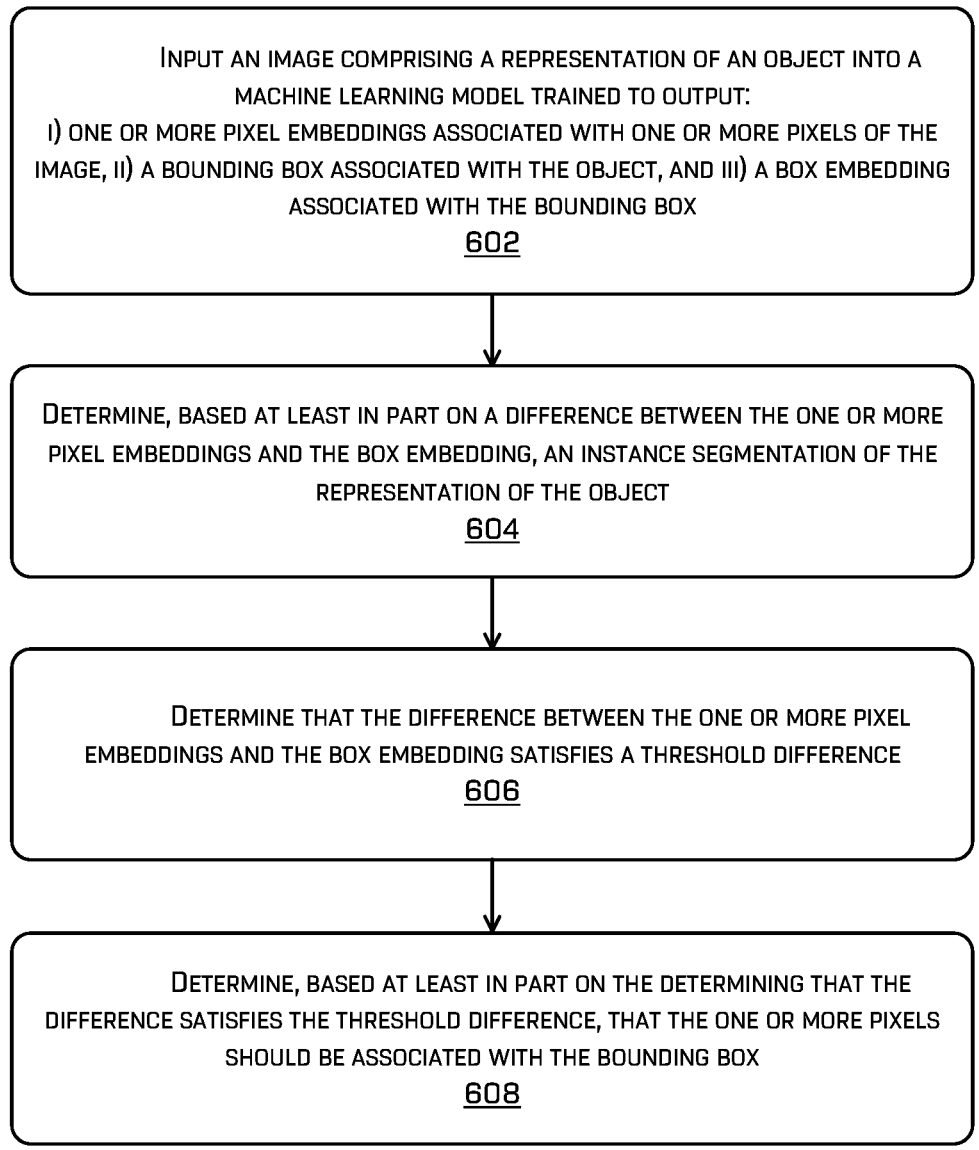
FIG. 6 is a flow chart illustrating an example process for implementing a neural network that outputs image embeddings that may be used to determine whether an object matches another object, as described herein.

FIG. 6 is a flow chart illustrating an example process 600 for implementing a neural network that outputs image embeddings that may be used to determine whether an object matches another object, as described herein. For example, the neural network may be trained by a process the same as or similar to process 500 to learn image embeddings to determine instances and/or associate with bounding boxes. In some examples, process 600 may include one or multiple features, components, and/or functionality of embodiments described herein with reference to FIGS. 1-5. For instance, process 600 may be performed by vehicle computing system 108.

At 602, vehicle computing system 108 may input an image comprising a representation of an object into a machine learning model trained to output one or more pixel embeddings associated with one or more pixels of the image and a bounding box associated with the object. The machine learning model is also trained to output a box embedding associated with the bounding box.

At 604, vehicle computing system 108 may determine, based at least in part on a difference between the pixel embeddings and the box embedding, an instance segmentation of the representation of the object. The embedding points may form clusters that may be used to identify objects and/or to match (or otherwise associate) objects with one another. For example, if embeddings are within a threshold distance (e.g., a Euclidian distance) of one another, then such embeddings may likely be associated with a same object, or whether one of the objects corresponds to one of the bounding boxes.

At 606, vehicle computing system 108 may determine that the difference between the pixel embeddings associated with the object and the box embedding associated with the bounding box satisfies a threshold difference.

At 608, vehicle computing system 108 may determine, based at least in part on the determining that the difference satisfies the threshold difference, that the pixels should be associated with the bounding box.

In some implementations, vehicle computing system 108 may determine a mask associated with an object based at least in part on the image embedding associated with the bounding box of the object and the pixel embeddings associated with the object. In some implementations, based at least in part on the difference between the pixel embeddings associated with one object and the image embedding associated with a bounding box of another object, one of the objects may be masked without masking the other object.

Figure 7:
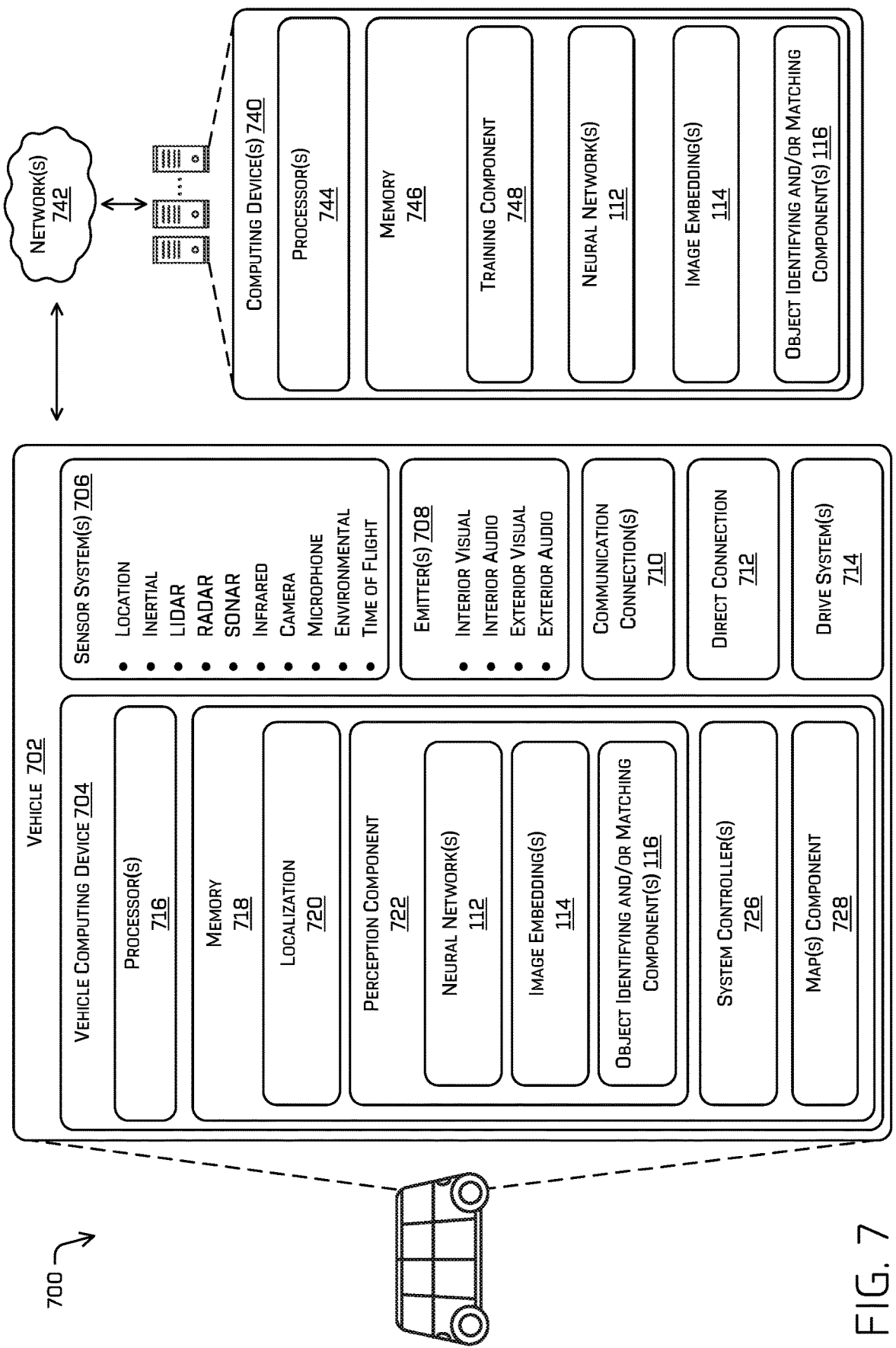
FIG. 7 is a block diagram of an example system for implementing the techniques described herein, as described herein.

FIG. 7 is a block diagram of an example system 700 for implementing the techniques described herein, in accordance with embodiments of the disclosure. In some examples, the system 700 may include one or multiple features, components, and/or functionality of embodiments described herein with reference to FIGS. 1-6.

In some embodiments, the system 700 may include a vehicle 702 (e.g., the vehicle 102 described herein with reference to FIG. 1). The vehicle 702 may include a vehicle computing device 704, one or more sensor systems 706, one or more emitters 708, one or more communication connections 710, at least one direct connection 712, and one or more drive systems 714.

The vehicle computing device 704 can include one or more processors 716 and memory 718 communicatively coupled with the one or more processors 716. In the illustrated example, the vehicle 702 is an autonomous vehicle; however, the vehicle 702 could be any other type of vehicle, or any other system having at least an image capture device (e.g., a camera enabled smartphone). In the illustrated example, the memory 718 of the vehicle computing device 704 stores a localization component 720, a perception component 722, a planning component 724, one or more system controllers 726, a map(s) component 728, the neural network(s) 112, the image embedding(s) 114, and/or the object identifying (and/or matching) component(s) 116. Perception component 722 may include neural network(s) 112, image embedding(s) 114, and/or object identifying (and/or matching) component(s) 116. Though depicted in FIG. 7 as residing in the memory 718 for illustrative purposes, it is contemplated that the localization component 720, the perception component 722, the planning component 724, the one or more system controllers 726, the neural network(s) 112, the image embedding(s) 114, and/or the object identifying (and/or matching) component(s) 116 can additionally, or alternatively, be accessible to the vehicle 702 (e.g., stored on, or otherwise accessible by, memory remote from the vehicle 702). In some instances, the vehicle computing device(s) 704 can correspond to the vehicle computing system 108 of FIG. 1.

In at least one example, the localization component 720 can include functionality to receive data from the sensor system(s) 706 to determine a position and/or orientation of the vehicle 702 (e.g., one or more of an x-, y-, z-position, roll, pitch, or yaw). For example, the localization component 720 can include and/or request/receive a map of an environment and can continuously determine a location and/or orientation of the autonomous vehicle within the map. In some instances, the localization component 720 can utilize SLAM (simultaneous localization and mapping), CLAMS (calibration, localization and mapping, simultaneously), relative SLAM, bundle adjustment, non-linear least squares optimization, or the like to receive image data, LIDAR data, radar data, IMU data, GPS data, wheel encoder data, and the like to accurately determine a location of the autonomous vehicle. In some instances, the localization component 720 can provide data to various components of the vehicle 702 to determine an initial position of an autonomous vehicle for generating a trajectory and/or for determining to retrieve map data including an occlusion grid from memory, as discussed herein.

In some instances, the perception component 722 can include functionality to perform object detection, segmentation, and/or classification. In some examples, the perception component 722 can provide processed sensor data that indicates a presence of an entity that is proximate to the vehicle 702 and/or a classification of the entity as an entity type (e.g., car, pedestrian, cyclist, animal, building, tree, road surface, curb, sidewalk, unknown, etc.). In additional and/or alternative examples, the perception component 722 can provide processed sensor data that indicates one or more characteristics associated with a detected entity (e.g., a tracked object) and/or the environment in which the entity is positioned. In some examples, characteristics associated with an entity can include, but are not limited to, an x-position (global and/or local position), a y-position (global and/or local position), a z-position (global and/or local position), an orientation (e.g., a roll, pitch, yaw), an entity type (e.g., a classification), a velocity of the entity, an acceleration of the entity, an extent of the entity (size), etc. Characteristics associated with the environment can include, but are not limited to, a presence of another entity in the environment, a state of another entity in the environment, a time of day, a day of a week, a season, a weather condition, an indication of darkness/light, etc.

In general, the planning component 724 can determine a path for the vehicle 702 to follow to traverse through an environment. For example, the planning component 724 can determine various routes and trajectories and various levels of detail. For example, the planning component 724 can determine a route to travel from a first location (e.g., a current location) to a second location (e.g., a target location). For the purpose of this discussion, a route can be a sequence of waypoints for travelling between two locations. As non-limiting examples, waypoints include streets, intersections, global positioning system (GPS) coordinates, etc. Further, the planning component 724 can generate an instruction for guiding the autonomous vehicle along at least a portion of the route from the first location to the second location. In at least one example, the planning component 724 can determine how to guide the autonomous vehicle from a first waypoint in the sequence of waypoints to a second waypoint in the sequence of waypoints. In some examples, the instruction can be a trajectory, or a portion of a trajectory. In some examples, multiple trajectories can be substantially simultaneously generated (e.g., within technical tolerances) in accordance with a receding horizon technique, wherein one of the multiple trajectories is selected for the vehicle 702 to navigate.

In at least one example, the vehicle computing device 704 can include one or more system controllers 726, which can be configured to control steering, propulsion, braking, safety, emitters, communication, and other systems of the vehicle 702. These system controller(s) 726 can communicate with and/or control corresponding systems of the drive system(s) 714 and/or other components of the vehicle 702.

The memory 718 can further include one or more maps (not shown) that can be used by the vehicle 702 to navigate within the environment. For the purpose of this discussion, a map can be any number of data structures modeled in two dimensions, three dimensions, or N-dimensions that are capable of providing information about an environment, such as, but not limited to, topologies (such as intersections), streets, mountain ranges, roads, terrain, and the environment in general. In some instances, a map can include, but is not limited to: texture information (e.g., color information (e.g., RGB color information, Lab color information, HSV/HSL color information), and the like), intensity information (e.g., LIDAR information, RADAR information, and the like); spatial information (e.g., image data projected onto a mesh, individual "surfels" (e.g., polygons associated with individual color and/or intensity)), reflectivity information (e.g., specularity information, retroreflectivity information, BRDF information, BSSRDF information, and the like). In one example, a map can include a three-dimensional mesh of the environment. In some instances, the map can be stored in a tiled format, such that individual tiles of the map represent a discrete portion of an environment and can be loaded into working memory as needed. In at least one example, the one or more maps can include at least one map (e.g., images and/or a mesh). In some examples, the vehicle 702 can be controlled based at least in part on the maps. That is, the maps can be used in connection with the localization component 720, the perception component 722, and/or the planning component 724 to determine a location of the vehicle 702, identify objects in an environment, and/or generate routes and/or trajectories to navigate within an environment.

In some examples, the one or more maps can be stored on a remote computing device(s) (such as the computing device(s) 740) accessible via network(s) 742. In some examples, multiple maps can be stored based on, for example, a characteristic (e.g., type of entity, time of day, day of week, season of the year, etc.). Storing multiple maps can have similar memory requirements but increase the speed at which data in a map can be accessed.

In some instances, aspects of some or all of the components discussed herein can include any models, algorithms, and/or machine learning algorithms. For example, in some instances, the components in the memory 718 (and the memory 746, discussed below) can be implemented as a neural network.

As described herein, an exemplary neural network is a biologically inspired algorithm which passes input data through a series of connected layers to produce an output. Each layer in a neural network can also comprise another neural network or can comprise any number of layers (whether convolutional or not). As can be understood in the context of this disclosure, a neural network can utilize machine learning, which can refer to a broad class of such algorithms in which an output is generated based on learned parameters.

Although discussed in the context of neural networks, any type of machine learning can be used consistent with this disclosure. For example, machine learning algorithms can include, but are not limited to, regression algorithms (e.g., ordinary least squares regression (OLSR), linear regression, logistic regression, stepwise regression, multivariate adaptive regression splines (MARS), locally estimated scatterplot smoothing (LOESS)), instance-based algorithms (e.g., ridge regression, least absolute shrinkage and selection operator (LASSO), elastic net, least-angle regression (LARS)), decisions tree algorithms (e.g., classification and regression tree (CART), iterative dichotomiser 3 (ID3), Chi-squared automatic interaction detection (CHAID), decision stump, conditional decision trees), Bayesian algorithms (e.g., naïve Bayes, Gaussian naïve Bayes, multinomial naïve Bayes, average one-dependence estimators (AODE), Bayesian belief network (BNN), Bayesian networks), clustering algorithms (e.g., k-means, k-medians, expectation maximization (EM), hierarchical clustering), association rule learning algorithms (e.g., perceptron, back-propagation, hopfield network, Radial Basis Function Network (RBFN)), deep learning algorithms (e.g., Deep Boltzmann Machine (DBM), Deep Belief Networks (DBN), Convolutional Neural Network (CNN), Stacked Auto-Encoders), Dimensionality Reduction Algorithms (e.g., Principal Component Analysis (PCA), Principal Component Regression (PCR), Partial Least Squares Regression (PLSR), Sammon Mapping, Multidimensional Scaling (MDS), Projection Pursuit, Linear Discriminant Analysis (LDA), Mixture Discriminant Analysis (MDA), Quadratic Discriminant Analysis (QDA), Flexible Discriminant Analysis (FDA)), Ensemble Algorithms (e.g., Boosting, Bootstrapped Aggregation (Bagging), AdaBoost, Stacked Generalization (blending), Gradient Boosting Machines (GBM), Gradient Boosted Regression Trees (GBRT), Random Forest), SVM (support vector machine), supervised learning, unsupervised learning, semi-supervised learning, etc.

Additional examples of architectures include neural networks such as ResNet-50, ResNet-101, VGG, DenseNet, PointNet, and the like.

In at least one example, the sensor system(s) 706 can include lidar sensors, radar sensors, ultrasonic transducers, sonar sensors, location sensors (e.g., GPS, compass, etc.), inertial sensors (e.g., inertial measurement units (IMUs), accelerometers, magnetometers, gyroscopes, etc.), cameras (e.g., RGB, IR, intensity, depth, time of flight, etc.), microphones, wheel encoders, environment sensors (e.g., temperature sensors, humidity sensors, light sensors, pressure sensors, etc.), an one or more time of flight (ToF) sensors, etc. The sensor system(s) 706 can include multiple instances of each of these or other types of sensors. For instance, the lidar sensors can include individual lidar sensors located at the corners, front, back, sides, and/or top of the vehicle 702. As another example, the camera sensors can include multiple cameras disposed at various locations about the exterior and/or interior of the vehicle 702. The sensor system(s) 706 can provide input to the vehicle computing device 704.

Additionally, or alternatively, the sensor system(s) 706 can send sensor data, via the one or more networks 742, to the one or more computing device(s) at a particular frequency, after a lapse of a predetermined period of time, in near real-time, etc. In some instances, the sensor system(s) 706 can correspond to the sensor(s) 106 of FIG. 1.

The vehicle 702 can also include one or more emitters 708 for emitting light and/or sound, as described above. The emitters 708 in this example include interior audio and visual emitters to communicate with passengers of the vehicle 702. By way of example and not limitation, interior emitters can include speakers, lights, signs, display screens, touch screens, haptic emitters (e.g., vibration and/or force feedback), mechanical actuators (e.g., seatbelt tensioners, seat positioners, headrest positioners, etc.), and the like. The emitters 708 in this example also include exterior emitters. By way of example and not limitation, the exterior emitters in this example include lights to signal a direction of travel or other indicator of vehicle action (e.g., indicator lights, signs, light arrays, etc.), and one or more audio emitters (e.g., speakers, speaker arrays, horns, etc.) to audibly communicate with pedestrians or other nearby vehicles, one or more of which comprising acoustic beam steering technology.

The vehicle 702 can also include one or more communication connection(s) 710 that enable communication between the vehicle 702 and one or more other local or remote computing device(s). For instance, the communication connection(s) 710 can facilitate communication with other local computing device(s) on the vehicle 702 and/or the drive system(s) 714. Also, the communication connection(s) 710 can allow the vehicle to communicate with other nearby computing device(s) (e.g., other nearby vehicles, traffic signals, etc.). The communications connection(s) 710 also enable the vehicle 702 to communicate with a remote teleoperations computing device or other remote services.

The communications connection(s) 710 can include physical and/or logical interfaces for connecting the vehicle computing device 704 to another computing device or a network, such as network(s) 742. For example, the communications connection(s) 710 can enable Wi-Fi-based communication such as via frequencies defined by the IEEE 802.11 standards, short range wireless frequencies such as Bluetooth®, cellular communication (e.g., 2G, 3G, 4G, 4G LTE, 5G, etc.) or any suitable wired or wireless communications protocol that enables the respective computing device to interface with the other computing device(s).

In at least one example, the vehicle 702 can include one or more drive systems 714. In some examples, the vehicle 702 can have a single drive system 714. In at least one example, if the vehicle 702 has multiple drive systems 714, individual drive systems 714 can be positioned on opposite ends of the vehicle 702 (e.g., the front and the rear, etc.). In at least one example, the drive system(s) 714 can include one or more sensor systems to detect conditions of the drive system(s) 714 and/or the surroundings of the vehicle 702. By way of example and not limitation, the sensor system(s) can include one or more wheel encoders (e.g., rotary encoders) to sense rotation of the wheels of the drive systems, inertial sensors (e.g., inertial measurement units, accelerometers, gyroscopes, magnetometers, etc.) to measure orientation and acceleration of the drive system, cameras or other image sensors, ultrasonic sensors to acoustically detect objects in the surroundings of the drive system, lidar sensors, radar sensors, etc. Some sensors, such as the wheel encoders can be unique to the drive system(s) 714. In some cases, the sensor system(s) on the drive system(s) 714 can overlap or supplement corresponding systems of the vehicle 702 (e.g., sensor system(s) 706).

The drive system(s) 714 can include many of the vehicle systems, including a high voltage battery, a motor to propel the vehicle, an inverter to convert direct current from the battery into alternating current for use by other vehicle systems, a steering system including a steering motor and steering rack (which can be electric), a braking system including hydraulic or electric actuators, a suspension system including hydraulic and/or pneumatic components, a stability control system for distributing brake forces to mitigate loss of traction and maintain control, an HVAC system, lighting (e.g., lighting such as head/tail lights to illuminate an exterior surrounding of the vehicle), and one or more other systems (e.g., cooling system, safety systems, onboard charging system, other electrical components such as a DC/DC converter, a high voltage junction, a high voltage cable, charging system, charge port, etc.). Additionally, the drive system(s) 714 can include a drive system controller which can receive and preprocess data from the sensor system(s) and to control operation of the various vehicle systems. In some examples, the drive system controller can include one or more processors and memory communicatively coupled with the one or more processors. The memory can store one or more systems to perform various functionalities of the drive system(s) 714. Furthermore, the drive system(s) 714 also include one or more communication connection(s) that enable communication by the respective drive system with one or more other local or remote computing device(s).

In at least one example, the direct connection 712 can provide a physical interface to couple the one or more drive system(s) 714 with the body of the vehicle 702. For example, the direct connection 712 can allow the transfer of energy, fluids, air, data, etc. between the drive system(s) 714 and the vehicle. In some instances, the direct connection 712 can further releasably secure the drive system(s) 714 to the body of the vehicle 702.

In at least one example, the components discussed herein can process sensor data, as described above, and can send their respective outputs, over the one or more network(s) 742, to one or more computing device(s) 740. In at least one example, the components discussed herein can send their respective outputs to the one or more computing device(s) 740 at a particular frequency, after a lapse of a predetermined period of time, in near real-time, etc.

In some examples, the vehicle 702 can send sensor data to one or more computing device(s) 740 via the network(s) 742. In some examples, the vehicle 702 can send raw sensor data to the computing device(s) 740. In other examples, the vehicle 702 can send processed sensor data and/or representations of sensor data to the computing device(s) 740. In some examples, the vehicle 702 can send sensor data to the computing device(s) 740 at a particular frequency, after a lapse of a predetermined period of time, in near real-time, etc. In some cases, the vehicle 702 can send sensor data (raw or processed) to the computing device(s) 740 as one or more log files.

The computing device(s) 740 can include processor(s) 744 and a memory 746 storing a training component 748, a map(s) component 750, the neural network(s) 112, the image embedding(s) 114, and/or the object identifying (and/or matching) component(s) 116.

The processor(s) 716 of the vehicle 702 and the processor(s) 744 of the computing device(s) 740 can be any suitable processor capable of executing instructions to process data and perform operations as described herein. By way of example and not limitation, the processor(s) 716 and 744 can comprise one or more Central Processing Units (CPUs), Graphics Processing Units (GPUs), or any other device or portion of a device that processes electronic data to transform that electronic data into other electronic data that can be stored in registers and/or memory. In some examples, integrated circuits (e.g., ASICs, etc.), gate arrays (e.g., FPGAs, etc.), and other hardware devices can also be considered processors in so far as they are configured to implement encoded instructions.

Memory 718 and 746 are examples of non-transitory computer-readable media. The memory 718 and 746 can store an operating system and one or more software applications, instructions, programs, and/or data to implement the methods described herein and the functions attributed to the various systems. In various implementations, the memory can be implemented using any suitable memory technology, such as static random access memory (SRAM), synchronous dynamic RAM (SDRAM), nonvolatile/Flash-type memory, or any other type of memory capable of storing information. The architectures, systems, and individual elements described herein can include many other logical, programmatic, and physical components, of which those shown in the accompanying figures are merely examples that are related to the discussion herein.

As can be understood, the components discussed herein are described as divided for illustrative purposes. However, the operations performed by the various components can be combined or performed in any other component.

It should be noted that while FIG. 7 is illustrated as a distributed system, in alternative examples, components of the vehicle 702 can be associated with the computing device(s) 740 and/or components of the computing device(s) 740 can be associated with the vehicle 702. That is, the vehicle 702 can perform one or more of the functions associated with the computing device(s) 740, and vice versa. Further, aspects of the neural network(s) 112, the image embedding(s) 114, and/or the object identifying (and/or matching) component(s) 116 can be performed on any of the devices discussed herein.

Example Clauses

A. A system comprising: one or more processors; and one or more computer-readable media storing instructions executable by the one or more processors, wherein the instructions, when executed, cause the system to perform operations comprising: training a machine learned (ML) model based at least in part on a subset of examples, the training comprising: identifying a reference region associated with an object represented in an image; determining a training bounding box associated with the object; determining first embeddings for pixels of the reference region; associating a second embedding for the training bounding box with the first embeddings; and minimizing a loss function with respect to a difference between the first embeddings and the second embedding; and transmitting the ML model to an autonomous vehicle for detecting one or more additional objects in an environment.

B. The system of paragraph A, the operations further comprising: determining a loss based at least in part on the difference, or a square of the difference, between the first embeddings and the second embedding.

C. The system of paragraph A, the operations further comprising: determining, as an instance segmentation, pixels of the image having the first embeddings within a threshold distance of the second embedding.

D. The system of paragraph A, wherein the reference region is comprised of pixels associated with the object.

E. The system of paragraph A, the operations further comprising:
averaging together the first embeddings for the pixels of the reference region to determine an average pixel embedding, wherein minimizing the loss function with respect to a difference between the first embeddings and the second embedding comprises minimizing the loss function with respect to a difference between the average pixel embedding and the second embedding.

F. The system of paragraph E, wherein the first embeddings and the second comprise vectors.

G. A computer-implemented method comprising: inputting an image comprising a representation of an object into a machine learning model trained to output: i) one or more pixel parameters associated with one or more pixels of the image; ii) a bounding box associated with the object; and iii) a box parameter associated with the bounding box; and determining, based at least in part on a difference between the one or more pixel parameters and the box parameter, an identifier for the object and object pixels associated with the object.

H. The computer-implemented method of paragraph G, wherein the one or more pixel parameters comprise one or more pixel embeddings, and wherein the box parameter comprises a box embedding, the method further comprising: determining a mask associated with the object based at least in part on the box embedding and the one or more pixel embeddings.

I. The computer-implemented method of paragraph G, wherein the machine learning model is further trained to: determine that the difference between the one or more pixel parameters and the box parameters satisfies a threshold difference; and determine, based at least in part on the determining that the difference satisfies the threshold difference, that the one or more pixels should be associated with the bounding box.

J. The computer-implemented method of paragraph G, wherein the machine learned model is trained by: determining an average parameter of the one or more pixel parameters; and determining a loss function with respect to a difference between the average pixel parameter and the box parameter, wherein the one or more pixels are comprised of pixels associated with the object.

K. The computer-implemented method of paragraph G, wherein: the object is a first object and the one or more pixel parameters are one or more first pixel parameters, and the machine learning model is further trained to output one or more second pixel parameters associated with one or more second pixels of a second representation of a second object in the image, and the computer-implemented method further comprises: determining, based at least in part on a difference between the one or more first pixel embeddings and the one or more second pixel embeddings, that the one or more first pixels should be associated with the bounding box.

L. The computer-implemented method of paragraph K, wherein: the bounding box is associated with the first object, and the second object is at least partially within an area of the bounding box, the machine learning model is further trained to output a second bounding box associated with the second object and having second bounding box parameters, and the computer-implemented method further comprises: based at least in part on the difference between the one or more second pixel parameters and the second bounding box parameters, determining second object pixels associated with the second object and a second identifier associated with the second object.

M. The computer-implemented method of paragraph G, further comprising: capturing the image using an image sensor of an autonomous vehicle; and controlling the autonomous vehicle based at least in part on identifying the object in the image.

N. The computer-implemented method of paragraph G, wherein the box parameter is a vector.

O. One or more non-transitory computer-readable media storing instructions executable by one or more processors, wherein the instructions, when executed, cause the one or more processors to perform operations comprising: inputting an image comprising a representation of an object into a machine learning model trained to output: i) pixel parameters associated with pixels of the image; ii) a bounding box associated with the object; and iii) box parameters associated with the bounding box; and determining, based at least in part on a difference between the pixel parameters and the box parameters, a set of pixels associated with the object and an identifier associated with the object.

P. The one or more non-transitory computer-readable media of paragraph O, wherein: the pixel parameters comprise pixel embeddings, the box parameters comprise box embedding, and the difference between the pixel embeddings and the box embedding further comprises the difference between an average of the pixel embeddings and the box embedding.

Q. The one or more non-transitory computer-readable media of paragraph O, further comprising: determining a mask associated with the object based at least in part on the box embedding and the pixel embeddings.

R. The one or more non-transitory computer-readable media of paragraph O, wherein the machine learned model is trained based at least in part on: determining an average pixel embedding of the pixel embeddings associated with the set of pixels associated with the object; and determining a loss function with respect to a difference between the average pixel embeddings and the box embedding.

S. The one or more non-transitory computer-readable media of paragraph O, wherein: the object is a first object and the pixel parameters are first pixel parameters, and the machine learning model is further trained to output second pixel parameters associated with second pixels of a second representation of a second object in the image, and the operations further comprise: determining, based at least in part on a difference between the first pixel embeddings and the second pixel embeddings, that second pixels should be associated with the bounding box.

T. The one or more non-transitory computer-readable media of paragraph S, wherein: the bounding box is associated with the first object, and the second object is at least partially within an area of the bounding box, and the operations further comprise: determining a second bounding box associated with the second object; determining second box parameters associated with the second bounding box; based at least in part on a second difference between the second pixel parameters and the second box embedding, determining a second set of pixels associated with the second object and a second identified associated with the second object.

While the example clauses described above are described with respect to one particular implementation, it should be understood that, in the context of this document, the content of the example clauses can also be implemented via a method, device, system, a computer-readable medium, and/or another implementation.

CONCLUSION

While one or more examples of the techniques described herein have been described, various alterations, additions, permutations and equivalents thereof are included within the scope of the techniques described herein.

In the description of examples, reference is made to the accompanying drawings that form a part hereof, which show by way of illustration specific examples of the claimed subject matter. It is to be understood that other examples can be used and that changes or alterations, such as structural changes, can be made. Such examples, changes or alterations are not necessarily departures from the scope with respect to the intended claimed subject matter. While the steps herein can be presented in a certain order, in some cases the ordering can be changed so that certain inputs are provided at different times or in a different order without changing the function of the systems and methods described. The disclosed procedures could also be executed in different orders. Additionally, various computations that are herein need not be performed in the order disclosed, and other examples using alternative orderings of the computations could be readily implemented. In addition to being reordered, the computations could also be decomposed into sub-computations with the same results.

What is claimed is:

1. A system comprising:
one or more processors; and
one or more computer-readable media storing instructions executable by the one or more processors, wherein the instructions, when executed, cause the system to perform operations comprising:
training a machine learned (ML) model based at least in part on a subset of examples, the training comprising:
identifying a reference region associated with an object represented in an image;
determining a training bounding box associated with the object;
determining first embeddings for pixels of the reference region;
associating a second embedding for the training bounding box with the first embeddings; and
minimizing a loss function with respect to a difference between the first embeddings associated with the object and the second embedding associated with the training bounding box; and
transmitting the ML model to an autonomous vehicle for detecting one or more additional objects in an environment.

2. The system as claim 1 recites, the operations further comprising:
determining a loss based at least in part on the difference, or a square of the difference, between the first embeddings and the second embedding.

3. The system as claim 1 recites, the operations further comprising:
determining, as an instance segmentation, pixels of the image having the first embeddings within a threshold distance of the second embedding.

4. The system as claim 1 recites, wherein the reference region is comprised of pixels associated with the object.

5. The system as claim 1 recites, the operations further comprising:
averaging together the first embeddings for the pixels of the reference region to determine an average pixel embedding, wherein minimizing the loss function with respect to the difference between the first embeddings and the second embedding comprises minimizing the loss function with respect to a second difference between the average pixel embedding and the second embedding.

6. The system as claim 5 recites, wherein the first embeddings and the second embedding comprise vectors.

7. A computer-implemented method comprising:
inputting an image comprising a representation of an object into a machine learned model trained to output:
i) one or more pixel parameters associated with one or more pixels of the image;
ii) a bounding box associated with the object; and
iii) a box parameter associated with the bounding box; and
determining, based at least in part on a difference between the one or more pixel parameters and the box parameter, an identifier for the object and object pixels associated with the object.

8. The computer-implemented method of claim 7, wherein the one or more pixel parameters comprise one or more pixel embeddings, and
wherein the box parameter comprises a box embedding, the method further comprising:
determining a mask associated with the object based at least in part on the box embedding and the one or more pixel embeddings.

9. The computer-implemented method of claim 7, wherein the machine learned model is further trained to:
determine that the difference between the one or more pixel parameters and the box parameter satisfies a threshold difference; and
determine, based at least in part on the determining that the difference satisfies the threshold difference, that the one or more pixels are associated with the bounding box.

10. The computer-implemented method of claim 7, wherein the machine learned model is trained by:
determining an average parameter of the one or more pixel parameters; and
determining a loss function with respect to a second difference between the average parameter and the box parameter,
wherein the one or more pixels comprise the object pixels associated with the object.

11. The computer-implemented method of claim 7, wherein:
the object is a first object and the one or more pixel parameters are one or more first pixel parameters,
the machine learned model is further trained to output one or more second pixel parameters associated with one or more second pixels of a second representation of a second object in the image, and
the computer-implemented method further comprises:
determining, based at least in part on a second difference between the one or more first pixel parameters and the one or more second pixel parameters, that one or more first pixels are associated with the bounding box.

12. The computer-implemented method of claim 11, wherein:

the bounding box is associated with the first object, and the second object is at least partially within an area of the bounding box,
the machine learned model is further trained to output a second bounding box associated with the second object and having second bounding box parameters, and
the computer-implemented method further comprises:
based at least in part on the difference between the one or more second pixel parameters and the second bounding box parameters, determining second object pixels associated with the second object and a second identifier associated with the second object.

13. The computer-implemented method of claim 7, further comprising:
capturing the image using an image sensor of an autonomous vehicle; and
controlling the autonomous vehicle based at least in part on identifying the object in the image.

14. The computer-implemented method of claim 7, wherein the box parameter is a vector.

15. One or more non-transitory computer-readable media storing instructions executable by one or more processors, wherein the instructions, when executed, cause the one or more processors to perform operations comprising:
inputting an image comprising a representation of an object into a machine learned model trained to output:
i) pixel parameters associated with pixels of the image;
ii) a bounding box associated with the object; and
iii) box parameters associated with the bounding box; and
determining, based at least in part on a difference between the pixel parameters and the box parameters, a set of pixels associated with the object and an identifier associated with the object.

16. The one or more non-transitory computer-readable media of claim 15, wherein:
the pixel parameters comprise pixel embeddings,
the box parameters comprise a box embedding, and
the difference between the pixel embeddings and the box embedding further comprises a second difference between an average of the pixel embeddings and the box embedding.

17. The one or more non-transitory computer-readable media of claim 16, further comprising:
determining a mask associated with the object based at least in part on the box embedding and the pixel embeddings.

18. The one or more non-transitory computer-readable media of claim 16, wherein the machine learned model is trained based at least in part on:
determining an average pixel embedding of the pixel embeddings associated with the set of pixels associated with the object; and
determining a loss function with respect to a second difference between the average pixel embedding and the box embedding.

19. The one or more non-transitory computer-readable media of claim 15, wherein:
the object is a first object,
the pixel parameters are first pixel parameters associated with first pixels of the image,
the machine learned model is further trained to output second pixel parameters associated with second pixels of a second representation of a second object in the image, and the operations further comprise:
- determining, based at least in part on a difference between the first pixel parameters and the second pixel parameters, that the first pixels are associated with the bounding box.

20. The one or more non-transitory computer-readable media of claim 19, wherein:
- the bounding box is associated with the first object, and the second object is at least partially within an area of the bounding box, and
- the operations further comprise:
  - determining a second bounding box associated with the second object;
  - determining second box parameters associated with the second bounding box; and
  - based at least in part on a second difference between the second pixel parameters and the second box parameters, determining a second set of pixels associated with the second object and a second identifier associated with the second object.

\* \* \* \* \*